US009970643B2

(12) United States Patent
Adema et al.

(10) Patent No.: US 9,970,643 B2
(45) Date of Patent: May 15, 2018

(54) ROTATABLE HEAT SINK WITH INTERNAL CONVECTION

(71) Applicant: CHRISTIE DIGITAL SYSTEMS USA, INC., Cypress, CA (US)

(72) Inventors: Daniel Robert Adema, Kitchener (CA); Graham Hill, Waterloo (CA)

(73) Assignee: CHRISTIE DIGITAL SYSTEMS USA, INC., Cypress, CA (US)

( * ) Notice: Subject to any disclaimer, the term of this patent is extended or adjusted under 35 U.S.C. 154(b) by 205 days.

(21) Appl. No.: 15/153,321

(22) Filed: May 12, 2016

(65) Prior Publication Data

US 2017/0328549 A1 Nov. 16, 2017

(51) Int. Cl.
*F21V 29/51* (2015.01)
*F21V 29/502* (2015.01)
*F21V 29/74* (2015.01)
*F21V 29/56* (2015.01)
*F21V 29/71* (2015.01)
*F21V 9/16* (2006.01)
*G03B 21/16* (2006.01)
*G03B 21/20* (2006.01)
*F21V 29/65* (2015.01)

(52) U.S. Cl.
CPC .............. *F21V 29/502* (2015.01); *F21V 9/16* (2013.01); *F21V 29/56* (2015.01); *F21V 29/713* (2015.01); *F21V 29/74* (2015.01); *G03B 21/16* (2013.01); *G03B 21/204* (2013.01)

(58) Field of Classification Search
CPC ...... F21V 29/502; F21V 29/56; F21V 29/713; F21V 29/74; F21V 9/16; G03B 21/16; G03B 21/204
See application file for complete search history.

(56) References Cited

U.S. PATENT DOCUMENTS

| 3,999,400 | A | 12/1976 | Gray |
| 4,567,597 | A | 1/1986 | Mandella |
| 5,439,081 | A | 8/1995 | Glass |
| 6,408,937 | B1 | 6/2002 | Roy |
| 6,945,314 | B2 | 9/2005 | Farrow et al. |
| 7,667,969 | B2 * | 2/2010 | Khanna ................. H01L 23/433 165/80.4 |

(Continued)

OTHER PUBLICATIONS

Extended European Search Report (EESR) dated Oct. 12, 2017, by EPO, re European Patent Application No. 17156704.3.

*Primary Examiner* — Anh Mai
*Assistant Examiner* — Nathaniel Lee
(74) *Attorney, Agent, or Firm* — Perry + Currier, Inc.

(57) ABSTRACT

According to the present specification there is provided a rotatable heat sink device which comprises a heat sink configured to enclose a cooling fluid, and the heat sink is rotatable about a rotational axis. The heat sink, in turn, comprises a first portion configured to receive thermal energy from a source external to the heat sink, and a second portion configured to dissipate at least a portion of the thermal energy to surroundings external to the device. The device further comprises an optical wavelength conversion material disposed on an outside surface of the first portion of the heat sink, and an agitator disposed inside the heat sink. The agitator is rotationally independent of the heat sink and is configured to promote circulation of the cooling fluid between the first portion and the second portion.

20 Claims, 11 Drawing Sheets

(56) References Cited

U.S. PATENT DOCUMENTS

| | | | |
|---|---|---|---|
| 7,980,078 B2 * | 7/2011 | McCutchen | F28D 15/0233 60/645 |
| 2004/0052049 A1 | 3/2004 | Wu et al. | |
| 2009/0032223 A1 | 2/2009 | Zimmerman et al. | |
| 2009/0038780 A1 | 2/2009 | Liu | |
| 2014/0240676 A1 * | 8/2014 | Maes | G03B 21/204 353/20 |
| 2015/0219327 A1 | 8/2015 | Adema et al. | |
| 2016/0025307 A1 | 1/2016 | Adema et al. | |

* cited by examiner

ROTATABLE HEAT SINK WITH INTERNAL CONVECTION

FIELD

The present specification relates to heat sinks, and in particular to rotatable heat sinks for optical wavelength conversion materials.

BACKGROUND

In many image projection systems an optical wavelength conversion material is used as a light source. The wavelength conversion material is excited by an excitation light, such as a laser, and in response the conversion material emits light at a wavelength different from the wavelength of the excitation light. Many wavelength conversion materials such as phosphors and quantum dots (QDs) are thermally limited. The high energy density at the excitation light spot is typically reduced by rotating the conversion material in order to move the excitation light spot and thereby distribute the heat of excitation throughout a larger volume of the conversion material. The conversion material can also be placed on a rotating solid disk which can act as a heat sink and can absorb and dissipate some of the excitation heat from the conversion material.

In order to further increase the rate of heat removal and dissipation from the conversion material, various solutions have been proposed. One approach is to use as the heat sink a larger diameter, solid disk rotating at a higher speed. However, such a larger and heavier rotating disk can be hard to manage mechanically and difficult to package in a projection system. Even if multiple parallel fins are added to the solid rotating disk, the air flow and thermal conductivity constraints can limit the usefulness of the fins: if the fins are spaced too closely, the air between them can stagnate, thereby hindering heat dissipation from the fins. If the fins are spaced too far from one another, there can be a large temperature drop between the base of the fins closer to the conversion material and the bases of successively further fins. The further the fins are from the conversion material, and the lower their base temperature, the lower the rate at which they can dissipate heat. As such, using multiple parallel fins can provide only diminishing returns in the form of increased heat dissipation rate.

Another class of approaches uses liquid cooling to increase heat dissipation rate. For example, the conversion material and/or the heat sink can be partially or fully submerged and rotated in a bath of the cooling liquid. This approach can present challenges rated to liquid containment, compatibility of the cooling liquid with the conversion material, and optical aberrations caused by the system and in particular by the cooling liquid. Many of these liquid-cooled approaches also require rotating mechanical fluid seals, which have a limited lifetime and can require frequent inspection, maintenance, and replacement.

SUMMARY

The present specification is directed to a rotatable heat sink device which employs thermal conduction and internal convection provided by a cooling fluid to absorb heat from an optical wavelength conversion material and dissipate at least a portion of that heat to the surroundings external to the heat sink device. The heat sink device comprises a heat sink configured to enclose the cooling fluid and to be rotatable about a rotational axis. The heat sink comprises a first portion comprising a first end wall disposed radially to the rotational axis, and configured to absorb thermal energy from the conversion material. The heat sink also comprises a second portion configured to dissipate at least a portion of the thermal energy to surroundings external to the heat sink. The second portion comprises: a second end wall disposed radially to the rotational axis, and a side wall cooperating with the first end wall and the second end wall to define the heat sink.

The device further comprises an agitator disposed inside the heat sink, which agitator is rotationally independent of the heat sink. The agitator agitates the cooling fluid inside the heat sink and promotes circulation of the cooling fluid between the first portion and the second portion. This circulation promotes the internal convection that enhances heat transfer from the first portion to the second portion of the heat sink where the heat can be dissipated to the surroundings.

The internal cooling fluid convection increases the rate at which the device can absorb, transport, and dissipate heat from the conversion material. As such, the device can be designed to have a smaller diameter and operate at lower rotational speeds, which can make the device easier to operate mechanically and to package with a projection system. In addition, the device can take advantage of fluid cooling in a rotating application, without the need for rotating mechanical seals and without the cooling fluid coming into contact and potentially interfering with the conversion material.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, ZZ, and the like). Similar logic can be applied for two or more items in any occurrence of "at least one . . . " and "one or more . . . " language.

An aspect of the present specification provides a device comprising: a heat sink configured to enclose a cooling fluid, the heat sink rotatable about a rotational axis, the heat sink comprising: a first portion configured to receive thermal energy from a source external to the heat sink; and a second portion configured to dissipate at least a portion of the thermal energy to surroundings external to the device. The device further comprises an optical wavelength conversion material disposed on an outside surface of the first portion; and an agitator disposed inside the heat sink, the agitator rotationally independent of the heat sink, the agitator configured to promote circulation of the cooling fluid between the first portion and the second portion.

The first portion can comprise a first end wall disposed radially to the rotational axis; and the second portion can comprise: a second end wall disposed radially to the rotational axis; and a side wall cooperating with the first end wall and the second end wall to define the heat sink.

The side wall can be disposed at an angle to the rotational axis, the angle greater than 0° and less than 90°.

The second portion can further comprise one or more fins extending from an outer surface of one or more of the side wall and the second end wall.

An inner surface of one or more of the first portion and the second portion can comprise one or more surface features configured to promote circulation of the cooling fluid between the first portion and the second portion.

The one or more surface features can comprise one or more of depressions and projections.

The one or more surface features can comprise one or more of grooves, baffles, fins, and blades.

An inner surface of the side wall can comprise a spiral screw surface profile configured to promote circulation of the cooling fluid between the first portion and the second portion.

The device can further comprise the cooling fluid enclosed inside the heat sink.

The cooling fluid can comprise a liquid coolant, or the cooling fluid can comprise a liquid and gas mixture.

The optical wavelength conversion material can comprise one or more of a phosphor and quantum dots.

The agitator can comprise one or more surface features configured to promote circulation of the cooling fluid between the first portion and the second portion.

The one or more surface features can comprise one or more of depressions and projections.

The agitator can be configured to be magnetically coupled to an agitator driver disposable outside the heat sink.

The agitator can be configured to be rotated about the rotational axis at one or more of a speed and a direction different than a corresponding rotational speed and direction of the heat sink.

The agitator can be configured to be rotated intermittently about the rotational axis.

The agitator can be configured to be oscillated about the rotational axis.

The agitator can be configured to remain static when the heat sink is rotating about the rotational axis.

Another aspect of the present specification provides a device comprising: a heat sink configured to enclose a cooling fluid, the heat sink rotatable about a rotational axis, the heat sink comprising: a first portion comprising a first end wall disposed radially to the rotational axis, the first portion configured to receive thermal energy from a source external to the heat sink; and a second portion configured to dissipate at least a portion of the thermal energy to surroundings external to the heat sink. The second portion comprises: a second end wall disposed radially to the rotational axis; and a side wall cooperating with the first end wall and the second end wall to define the heat sink. The device also comprises an agitator disposed inside the heat sink, the agitator rotationally independent of the heat sink. The agitator is configured to promote circulation of the cooling fluid between the first portion and the second portion.

BRIEF DESCRIPTION OF THE DRAWINGS

Some implementations of the present specification will now be described, by way of example only, with reference to the attached Figures, wherein.

DETAILED DESCRIPTION

Figure 1:
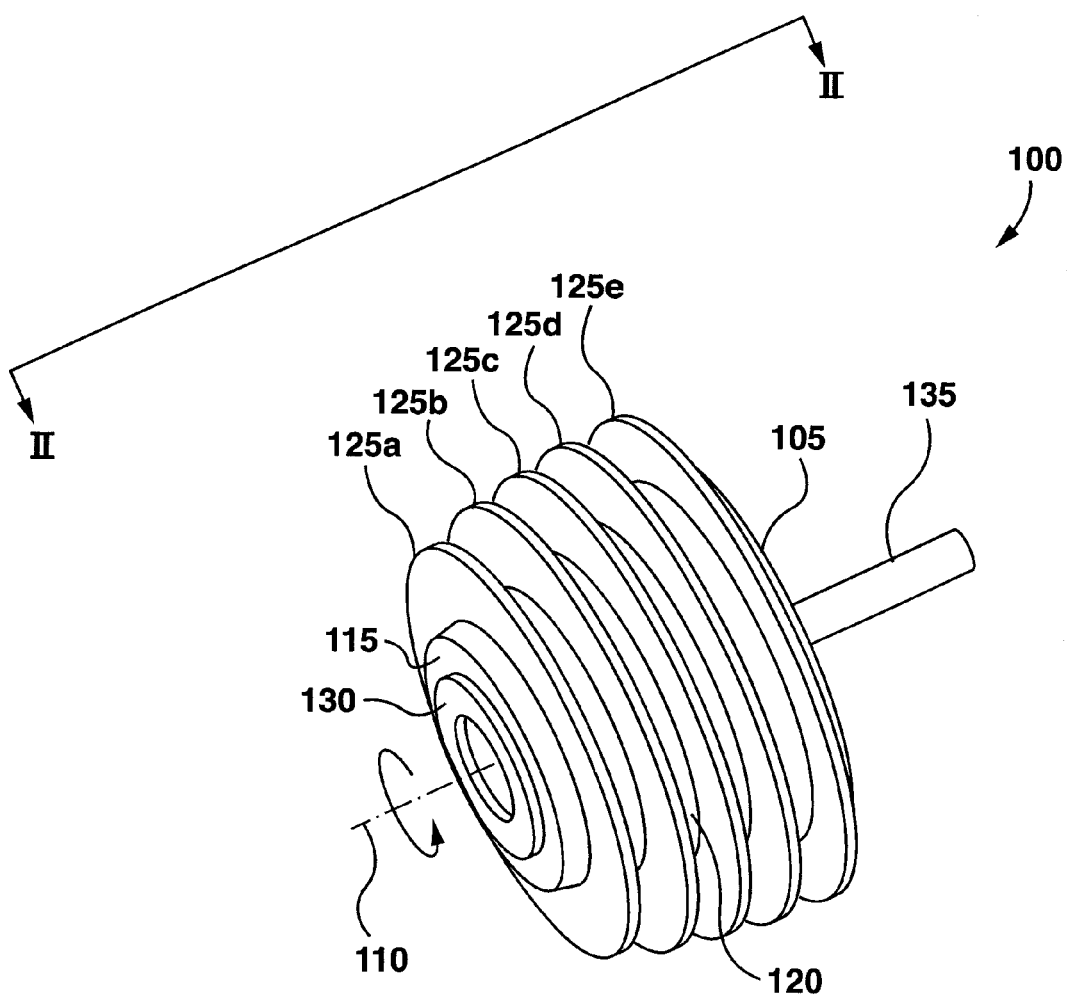
FIG. 1 shows a perspective view a rotatable heat sink device, according to non-limiting implementations.

FIG. 1 shows a perspective view of a heat sink device 100 comprising a heat sink 105 rotatable about a rotational axis 110. Heat sink 105 comprises a first end wall 115 and a second end wall (not visible in FIG. 1), both disposed radially to rotational axis 110. Heat sink 105 also comprises a side wall 120 cooperating with first end wall 115 and the second end wall to define heat sink 105. Heat sink 105 is configured to enclose a cooling fluid. Device 100 also comprises fins 125a, 125b, 125c, 125d, and 125e (collectively fins 125) extending radially from the outer surface of side wall 120. A ring-shaped layer of an optical wavelength conversion material 130 is disposed on the outside surface of first end wall 115. A shaft 135 extends from the second end wall along rotational axis 110. Shaft 135 can be used to couple device 100 to a source of mechanical actuation such as an electric motor.

When an excitation light excites, and thereby heats, conversion material 130, that thermal energy is conductively transferred to first end wall 115. Through conduction, and convection of the cooling fluid enclosed inside heat sink 105, some of the thermal energy is transferred from first end wall 115 to side wall 120, fins 125, and the second end wall, which then dissipate the thermal energy to the surroundings external to the device, including but not limited to the air surrounding device 100.

Figure 2:
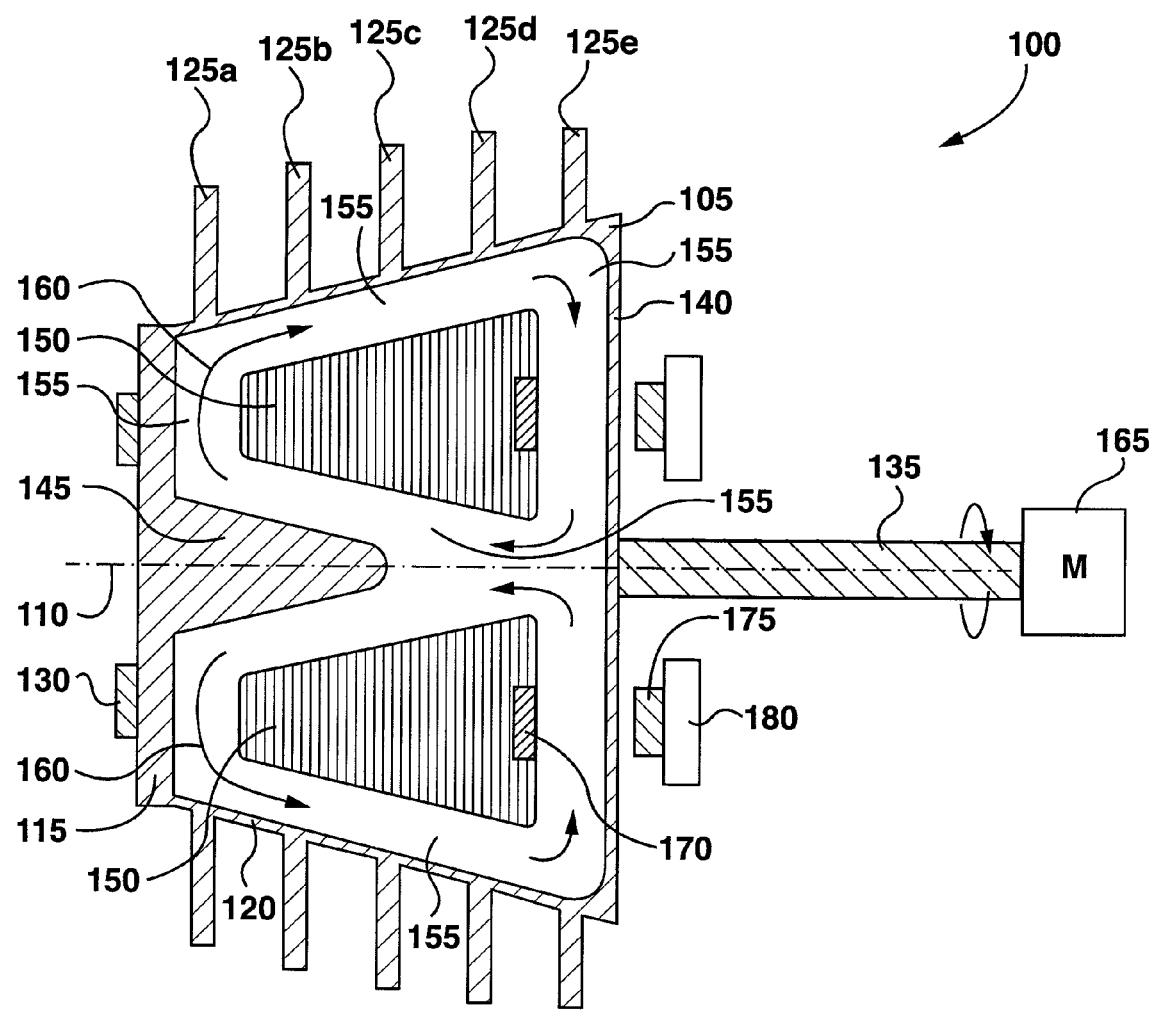
FIG. 2 shows a cross-section of the rotatable heat sink device of FIG. 1 along line II-II marked in FIG. 1.

FIG. 2 shows a cross-section of device 100 along line II-II marked on FIG. 1. First end wall 115, side wall 120, and a second end wall 140 cooperate to define heat sink 105 which encloses a cooling fluid. First end wall 115 comprises a projection 145 extending from the inner surface of first end wall 115. Projection 145 can direct and/or promote circulation of the cooling fluid.

Device 100 also comprises an agitator 150 disposed inside heat sink 105. Agitator 150 comprises one or more agitator magnets 170, which interact with driver magnets 175 of an agitator driver 180 disposed outside heat sink 105 to magnetically couple agitator 150 to agitator driver 180. Agitator driver 180 can be mechanically coupled to a source of mechanical actuation. As such, agitator 150 is rotationally independent of heat sink 105 in the sense that agitator 150 can move and/or rotate at a speed and/or direction different than the rotational speed and direction of heat sink 105. This rotational independence can allow agitator 150 to agitate and promote circulation of the cooling fluid, thereby enhancing internal convection between first end wall 115 which, in operation, receives heat from conversion material 130 and side wall 120 (and its fins 125) and end wall 140 which dissipate at least a portion of that heat to the surroundings external to device 100.

In addition, the space between first end wall 115 (and its projection 145), side wall 120, end wall 140, and agitator 150 can define flow channels 155 that direct the flow and internal convection of the cooling fluid. Moreover, the rotation of heat sink 105 combined with the independent motion of agitator 150 can further promote the circulation and flow of the cooling fluid between first end wall 115 and side wall 120 and end wall 140. The direction of this flow can be determined by one or more of: the direction of rotation/motion of heat sink 105 and agitator 150, the shape of heat sink 105 and agitator 150, the buoyancy difference between the warmer cooling fluid adjacent first end wall 115 and relatively cooler cooling fluid adjacent second end wall 140 (i.e. the temperature gradient in the cooling fluid), and any surface features on the inner surfaces of first end wall 115, side wall 120, and second end wall 140. In FIG. 2, the cooling fluid is shown to be flowing along flow direction 160.

A motor 165 can be coupled to device 100 via shaft 135 and can be used to drive the rotation of heat sink 105. Agitator driver 180 can be driven by the same motor or a different motor or other actuation source.

Generally, the heat sink can comprise two portions: a first portion configured to receive thermal energy from a source external to the heat sink, and a second portion configured to dissipate at least a portion of that thermal energy to the surroundings external to the device. In the example of device 100, the first portion comprises first end wall 115 which receives thermal energy from conversion material 130 when conversion material 130 is heated by an excitation light. The second portion comprises side wall 120 (and its fins 125) and end wall 140 which receive a portion of the heat from first end wall 115 through conduction through the material of heat sink 105 and conduction and convection by the cooling fluid, and then dissipate that heat to the air surrounding device 100. It should be noted that first end wall 115 can also dissipate some of the heat from conversion material 130 directly to the air outside device 100.

In other words then, device 100 comprises heat sink 105 configured to enclose the cooling fluid, and heat sink 105 is rotatable about rotational axis 110. Heat sink 105, in turn, comprises the first portion configured to receive thermal energy from a source external to the heat sink, and the second portion configured to dissipate at least a portion of the thermal energy to surroundings external to device 100. Device 100 further comprises optical wavelength conversion material 130 disposed on an outside surface of the first portion, and agitator 150 disposed inside heat sink 105. Agitator 150 is rotationally independent of heat sink 105, and agitator 150 is configured to promote circulation of the cooling fluid between the first portion and the second portion.

While FIGS. 1 and 2 show a given implementation of the rotatable heat sink device, different variations and implementations are possible. For instance, the shape of the heat sink is not limited to the shape of heat sink 105 shown in FIGS. 1 and 2: the heat sink can be of any shape so long as the heat sink is mass-symmetrical about rotational axis 110 so that the heat sink can be rotated without placing unbalanced, off-axis forces on shaft 135. Such a mass-symmetrical heat sink can form a part of a rotatable heat sink device that is mass-balanced for rotation about rotational axis 110.

For example, in other implementations where the heat sink is shaped differently, the first end wall and the second end wall need not be disposed radially to rotational axis 110; they can be curved, bent, or otherwise make an acute or obtuse angle with rotational axis 110. The side wall can also be curved or bent. Moreover, while in device 100 the diameter of first end wall 115 is shown as being smaller than the diameter of second end wall 140, it is contemplated that in other implementations the first end wall can have a diameter that is about the same or greater than the diameter of the second end wall. In some implementations there may not be a defined line or edge between the first and second portions; for example, where the heat sink has a curved shape without geometrical edges.

Device 100 is shown as having five parallel, ring-shaped fins 125 of equal height as measured from the outer surface side wall 120. However, in other implementations the device can comprise any suitable number of fins of any suitable shape and size positioned at any suitable position on the second portion of the heat sink. For example, the device can comprise fewer or more than five fins, which in turn can have uniform or varying dimensions, shapes, and inter-fin spacing. The outer perimeters of the fins can have shapes other than a circular shape, so long as heat sink 105 remains mass-symmetrical about rotational axis 110. While in device 100 fins extend only from side wall 120, it is contemplated that in other implementations fins can extend from one or more of first end wall 115, side wall 120, and second end wall 140.

In some implementations, pin, blade, and/or spiral fins can be used instead of and/or in addition to parallel ring fins. Moreover, in some implementations, the fins can be at least partially hollow allowing for circulation of the cooling fluid into and out of the fins. In other implementations, the rotatable heat sink device may comprise no fins.

In the implementations that comprise fins, the fins can be shaped and sized to draw air and propel its flow past the fins and the heat sink, thereby enhancing heat dissipation from the fins and the heat sink into that air. For example, blade or spiral fins can draw air and propel its flow past the fins and the heat sink to enhance heat dissipation.

In addition to fin surface area and air flow past the fins, the temperature of a fin can affect the rate of heat dissipation from that fin. The temperature of a fin can be determined by the temperature at the base of the fin where it attaches to side wall 120. The higher the base temperature, the higher the fin temperature and the higher the heat dissipation rate from that fin. Compared to conductive heat transfer alone, the convective heat transfer made possible by the circulating cooling fluid inside the heat sink can more effectively transfer heat from the first portion (e.g. first end wall 115) to the base of all of the fins 125. This in turn can increase the base temperature of all the fins 125 and can reduce the difference between the base temperature of the fins closest to the heat source (e.g. fin 125a) and those furthest from the heat source (e.g. fin 125e). This can increase the rate at which the fins collectively can dissipate the heat. In addition, this can allow for the fins to be spaced further from each other, thereby allowing enhanced air circulation between the fins, without significantly reducing the base temperature of the fins spaced furthest from the heat source located at the first portion of the heat sink.

Turning now to conversion material 130, it can be arranged in any shape that is mass-symmetrical about rotational axis 110 and provides for the illumination requirements of the specific application in which the conversion material is used. For example, the conversion material can be arranged in the shape of a disk. Conversion material 130 can comprise, but is not limited to, phosphors and quantum dots (QDs). In some implementations, conversion material 130 can be removable and/or detachable from heat sink 105, which can allow conversion material 130 to be repaired or replaced as necessary.

To provide the necessary rotation of conversion material 130, device 100 can be coupled to a mechanical actuation source using any suitable mechanical coupling including, but not limited to, one or more of shaft 135, gears, a gearbox, a chain and sprocket, a clutch, and/or a driving belt. The external actuation source can comprise, but is not limited to, an electric motor and a ring motor. Heat sink 105 can be made of any suitable material including, but not limited to, metals and metallic alloys. Heat sink 105 can comprise a resealable opening for filling, topping up, and/or replacing the cooling fluid. Heat sink 105 can also comprise an emergency pressure release valve to prevent over-pressurization of heat sink 105 in cases of overheating. The cooling fluid can comprise any suitable liquid coolant including a water-and-glycol mixture, and/or any suitable liquid and gas mixture. When the cooling fluid comprises a liquid coolant, the fluid flow in flow channels 155 can comprise single-phase flow. When the cooling fluid comprises a liquid and gas mixture, the fluid flow in flow channels 155 can comprise two-phase flow.

Turning now to agitator 150, FIG. 2 shows agitator 150 as having a trapezoidal cross-section. However, it is contemplated that the agitator can have any suitable shape and size, so long as the agitator can promote circulation of the cooling fluid between the first portion (e.g. first end wall 115) and the second portion (e.g. side wall 120 and end wall 140) of heat sink 105. In some implementations, agitator 150 can comprise surface features configured to promote circulation of the cooling fluid between the first portion and the second portion. These surface features can comprise, but are not limited to, depressions and/or projections. Some examples of such surface features include blades, baffles, fins, grooves, a spiral screw profiles, and the like.

While agitator 150 is shown as having an agitator magnet 170 near one end of agitator 150, it is contemplated that agitator magnet 170 can be in any suitable position in agitator 150. In some implementations, multiple or all portions of agitator 150 can be magnetic, magnetizable, or infused with magnetic or magnetizable materials. Moreover, agitator driver 180 need not be positioned adjacent second end wall 140. It is contemplated that agitator driver 180 can be positioned in any suitable position, including adjacent to or around the outer perimeter of side wall 120. It is contemplated that in operation device 100 can tolerate some slippage in the magnetic coupling between agitator 150 and agitator driver 180, so long as the cooling fluid continues to circulate between the first portion and the second portion of heat sink 105.

Agitator 150, as driven by agitator driver 180, promotes circulation of the cooling fluid between the first and second portions of heat sink 105. Agitator 150 promotes circulation by not moving at the same speed and direction as the rotational speed and direction of heat sink 105. This difference, in turn, exerts shear loading forces on the cooling fluid, which shear loading forces agitate and promote the circulation of the cooling fluid. It is contemplated that agitator 150 can move in any suitable manner including, but not limited to, rotating about rotational axis 110 at a speed and/or direction that is different than the speed and direction of the rotation of heat sink 105; rotate at a variable speed about rotational axis 110; rotate intermittently or in a pulsed manner about rotational axis 110; and oscillate about rotational axis 110, the oscillations comprising forward, static, and reverse phases.

It is also contemplated that agitator 150 can be held stationary by agitator driver 180, and remain static as heat sink 105, and the cooling fluid inside, rotate about rotational axis 110. In some implementations, agitator driver 180 can comprise an electromagnet. When the electromagnet is not powered, the agitator can flow with the cooling fluid rotating inside the rotating heat sink 105. When the electromagnet is powered, the agitator can be held stationary against the rotating cooling fluid, thereby agitating and promoting circulation of the cooling fluid.

The combination of first end wall 115 and its projection 145, side wall 120, second end wall 140, and agitator 150 define flow channels 155 along which the cooling fluid can flow and circulate inside heat sink 105. While FIG. 2 shows a particular shape for flow channels 155, it is contemplated that these flow channels can have any suitable shape so long as the cooling fluid can circulate between the first portion (e.g. first end wall 115) where the fluid absorbs heat and the second portion (e.g. side wall 120 and second end wall 140) where the fluid releases heat. The shape of the flow channels can be determined by the shape and relative positions of first end wall 115, side wall 120, second end wall 140, and agitator 150.

Moreover, while FIG. 2 shows the cooling fluid flowing in the flow channels 155 along flow directions 160, it is contemplated that the cooling fluid can flow in any suitable direction so long as the flow comprises circulation of the cooling fluid between the first portion and the second portion of heat sink 105. The flow direction can be affected by a number of factors including, but not limited to: shape and size of flow channels 155 and their orientations relative to rotational axis 110; temperature gradients in the cooling fluid; relative motion of heat sink 105 and agitator 150; and any features on the surface of agitator 150 and on the inner surfaces of first end wall 115, side wall 120, and second end wall 140.

While FIG. 2 shows first end wall 115 as comprising projection 145, it is contemplated that first end wall 115 may comprise any other suitable inner surface features including, but not limited to, depressions and/or projections. In yet other implementations, first end wall 115 can comprise no projection 145 and/or no other designed surface features. In implementations where first end wall 115 comprises inner surface features, these features can contribute to promoting circulation of the cooling fluid between the first and second portions of heat sink 105.

In addition, while device 100 is shown as comprising agitator 150 disposed inside heat sink 105, it is contemplated that in some implementations the rotatable heat sink device may not comprise a rotationally independent agitator disposed inside the heat sink. In these implementations, a number of factors can promote circulation of the cooling fluid between the first and second portions, the factors including, but not limited to: the orientation of the wall of the heat sink relative to the rotational axis; speed of rotation of the heat sink; features on the inner surface of the walls of the heat sink; and temperature gradients in the cooling fluid. Such features of the inner surface of the walls of the heat sink are discussed in greater detail below.

Figure 3A:
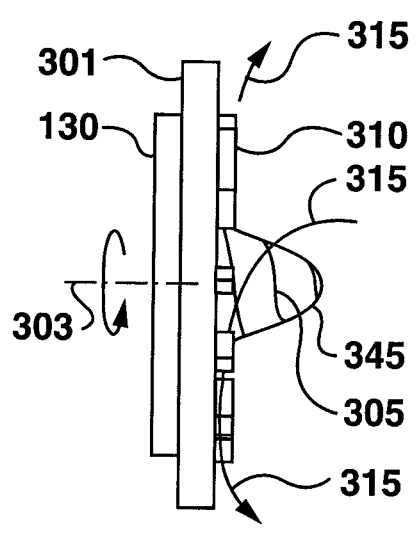
FIGS. 3a and 3b show side elevation and top plan views respectively of an end wall of the rotatable heat sink device, according to non-limiting implementations.
Figure 3B:
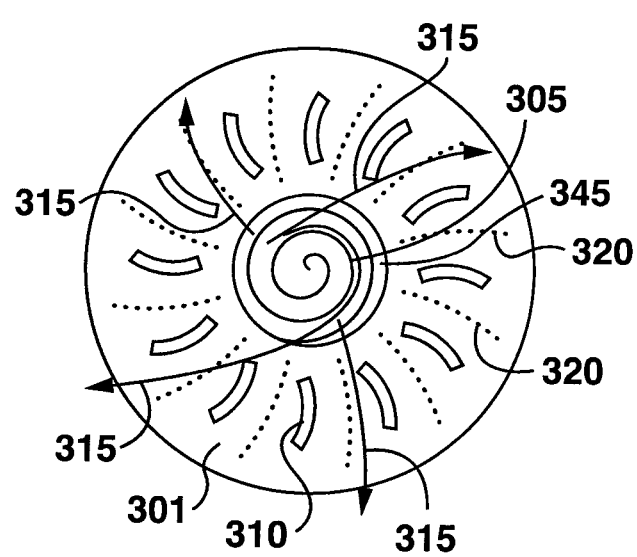

FIGS. 3a and 3b show side elevation and top plan views respectively of a first end wall 301 configured to rotate about a rotational axis 303. As shown in FIG. 3a, first end wall 301 comprises a ring of optical wavelength conversion material 130 on its outer surface. On its inner surface, i.e. the surface configured to face the inside of the heat sink, first end wall 301 comprises fins 310 and a projection 345. Projection 345 can comprise a spiral groove 305. As shown in FIG. 3b, the inner surface of first end wall 301 can also comprise grooves 320. Fins 310, grooves 320, and projection 345 and its spiral groove 305, working individually and/or together can increase the surface area for heat transfer from first end wall 301 to the cooling liquid and can also promote circulation of the cooling fluid and direct its flow along flow directions 315. It is also contemplated that first end wall 301 can comprise only one of or any selection of fins 310, grooves 320, and projection 345. Moreover, it is contemplated that projection 345 may not comprise spiral groove 305.

Figures 4A, 4B:
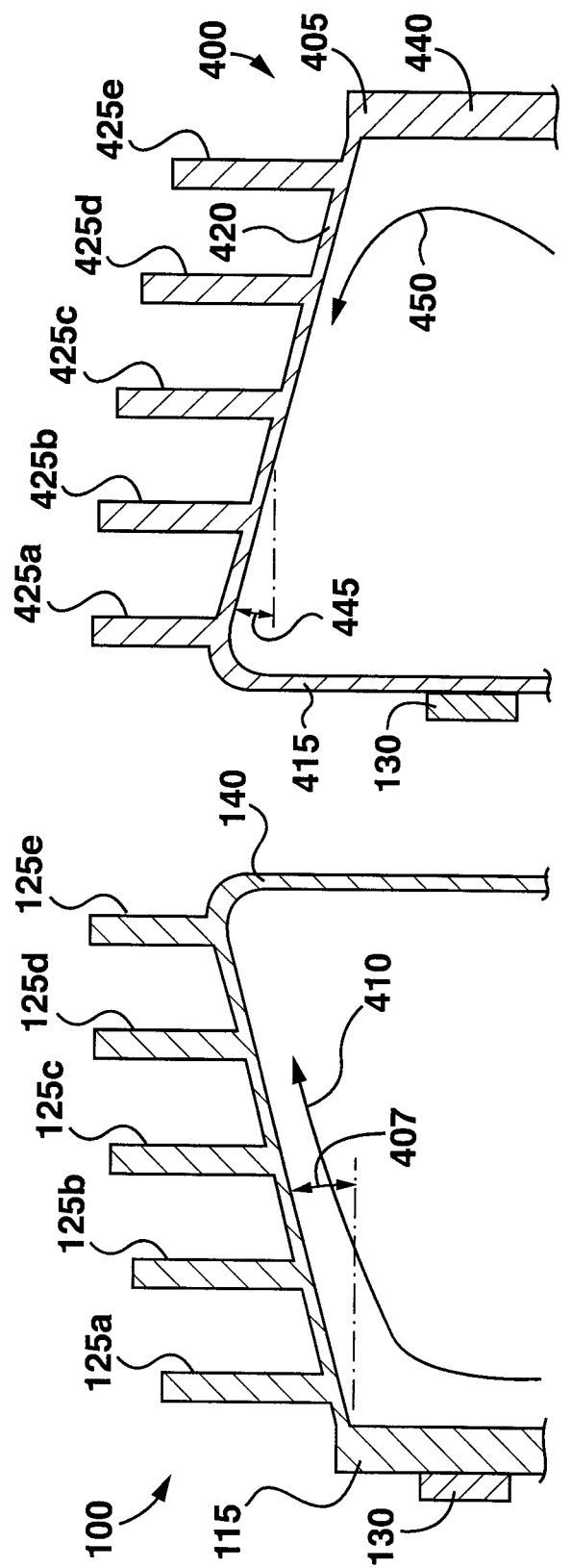
FIGS. 4a and 4b show partial cross-sectional views respectively of different implementations of the rotatable heat sink device, according to non-limiting implementations.

FIG. 4a depicts a partial cross-section of device 100, showing a portion of first end wall 115, side wall 120, fins 125, second end wall 140, and conversion material 130. Rotational axis 110 is also shown. Agitator 150 of device 100 is not shown in FIG. 4a. As the diameter of first end wall 115 is smaller than the diameter of second end wall 140, side wall 120 is disposed at an angle 407 relative to rotational axis 110. As device 100 rotates about rotational axis 110, the centrifugal force pushes the rotating cooling fluid against the angled side wall 120, which promotes flow of the cooling fluid in flow direction 410. Angle 407 can be larger than 0° and smaller then 90°. In some implementations, angle 407 can be larger than about 1° and smaller than about 25°. In yet other implementations, angle 407 can be larger than about 2° and smaller than about 10°. In yet other implementations, angle 407 can be about 5°.

FIG. 4b depicts a partial cross-section of rotatable heat sink device 400 comprising a first end wall 415 and a second end wall 440, both cooperating with a side wall 420 to define a heat sink 405 configured to enclose a cooling fluid and rotatable about rotational axis 402. Fins 425a, 425b, 425c, 425d, and 425e extend radially from side wall 420. A ring comprising conversion material 130 is disposed on an outer surface of first end wall 415. Device 400 is generally similar to device 100, with the main difference being that whereas in device 100 the diameter of first end wall 115 is smaller than the diameter of second end wall 140, in device 400 the diameter of first end wall 415 is larger than the diameter of second end wall 440.

As the diameter of first end wall 415 is larger than the diameter of second end wall 440, side wall 420 is disposed at an angle 445 relative to rotational axis 402. As device 400 rotates about rotational axis 402, the centrifugal force pushes the rotating cooling liquid against the angled side wall 420, which promotes flow of the cooling fluid in flow direction 450. Angle 445 can be larger than 0° and smaller then 90°. In some implementations, angle 445 can be larger than about 1° and smaller than about 25°. In yet other implementations, angle 445 can be larger than about 2° and smaller than about 10°. In yet other implementations, angle 445 can be about 5°. As can be seen in FIGS. 4a and 4b, the angle of the side wall relative to the rotational axis can be one of several factors which affect the circulation and flow direction of the cooling fluid inside the heat sink.

Figure 5:
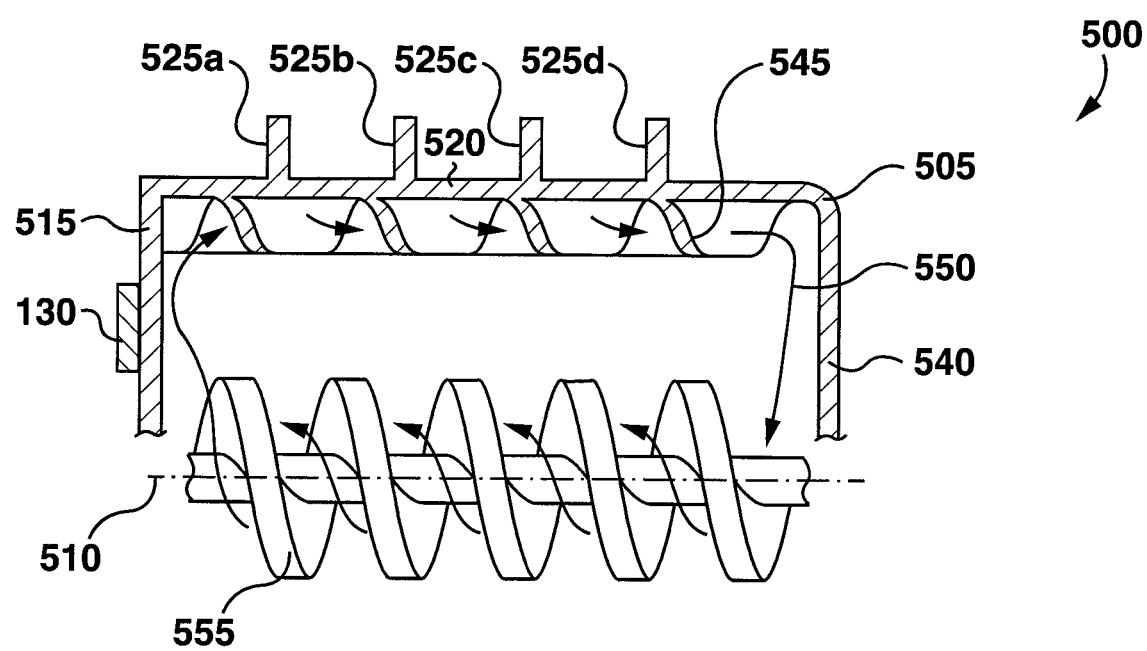
FIG. 5 shows a partial cross-sectional view of a rotatable heat sink device, according to non-limiting implementations.

FIG. 5 shows a partial cross-section of a rotatable heat sink device 500 comprising a first end wall 515 and a second end wall 540, both cooperating with a side wall 520 to define a heat sink 505 configured to enclose a cooling fluid and rotatable about rotational axis 510. Fins 525a, 525b, 525c, and 525d extend radially from side wall 520. A ring comprising conversion material 130 is disposed on the outer surface of first end wall 515. The inner surface of side wall 520 comprises a screw profile 545. Device 500 can also comprise an agitator 555 shaped as a spiral screw, shown in a side elevation view in FIG. 5. As heat sink 505, and the cooling fluid enclosed within in, rotate about rotational axis 510, screw profile 545 and agitator 555 can promote circulation of the cooling fluid and its flow in flow direction 550. The flow direction can be a function of the direction of rotation of heat sink 505 and agitator 555. Moreover, the side wall inner surface screw profile shown in FIG. 5 increases the inner surface area of side wall 520, thereby facilitating heat exchange from the cooling fluid to side wall 520.

In some implementations, instead of a rotationally independent agitator 555, device 500 comprises a spiral screw-shaped projection extending from one or both of the first end wall 515 and second end wall 540 along rotational axis 510. In these implementations, as device 500 rotates, the spiral rotation of the projection and the action of screw profile 545 of side wall 520 can promote the circulation of the cooling fluid and direct its flow along flow direction 550. The flow direction can be a function of the direction of rotation of heat sink 505 and the spiral projection.

Figure 6A:
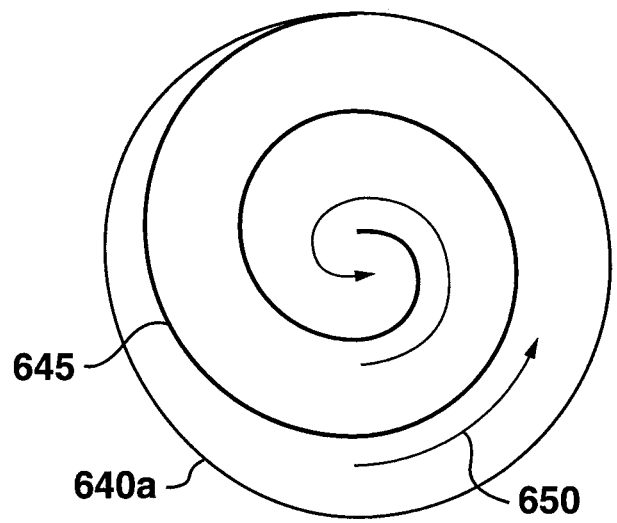
FIGS. 6a and 6b show two plan views of different implementations of a second end wall of the rotatable heat sink device, according to non-limiting implementations.

FIG. 6a shows a top plan view of a second end wall 640a comprising a spiral blade 645 extending from the inner surface of second end wall 640a and into a corresponding heat sink (not shown). In some implementation, instead of and/or in addition to spiral blade 645, second end wall 640a comprises a spiral groove formed as a depression into the inner surface of second end wall 640a. As second end wall 640a rotates about a corresponding rotational axis (not shown), spiral blade 645 can agitate the cooling fluid and direct its flow along flow direction 650. The flow direction can be a function of the direction of rotation of second end wall 640a about the rotational axis.

Figure 6B:
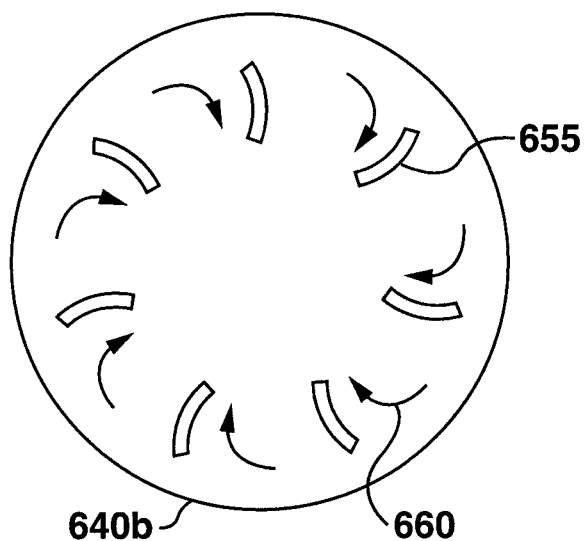

FIG. 6b shows a top plan view of a second end wall 640b comprising fins or blades 655 extending from the inner surface of second end wall 640b and into a corresponding heat sink (not shown). As second end wall 640b rotates about a corresponding rotational axis (not shown) blades 655 agitate the cooling fluid and direct its flow along flow direction 660. The flow direction can be a function of the direction of rotation of second end wall 640b about the rotational axis. The surface features shown in FIGS. 6a and 6b increase the inner surface area of second end walls 640a and 640b, thereby facilitating heat exchange from the cooling fluid to the second end walls.

In general, one or more of the first portion (e.g. the first end wall) and the second portion (e.g. the side wall and the second end wall) of the heat sink can comprise inner surface features configured to promote circulation of the cooling fluid between the first portion and the second portion of the corresponding heat sink. These surface features can comprise depressions and/or projections, including, but not limited to, blades, baffles, fins, grooves, and spiral screw profiles.

Figure 7:
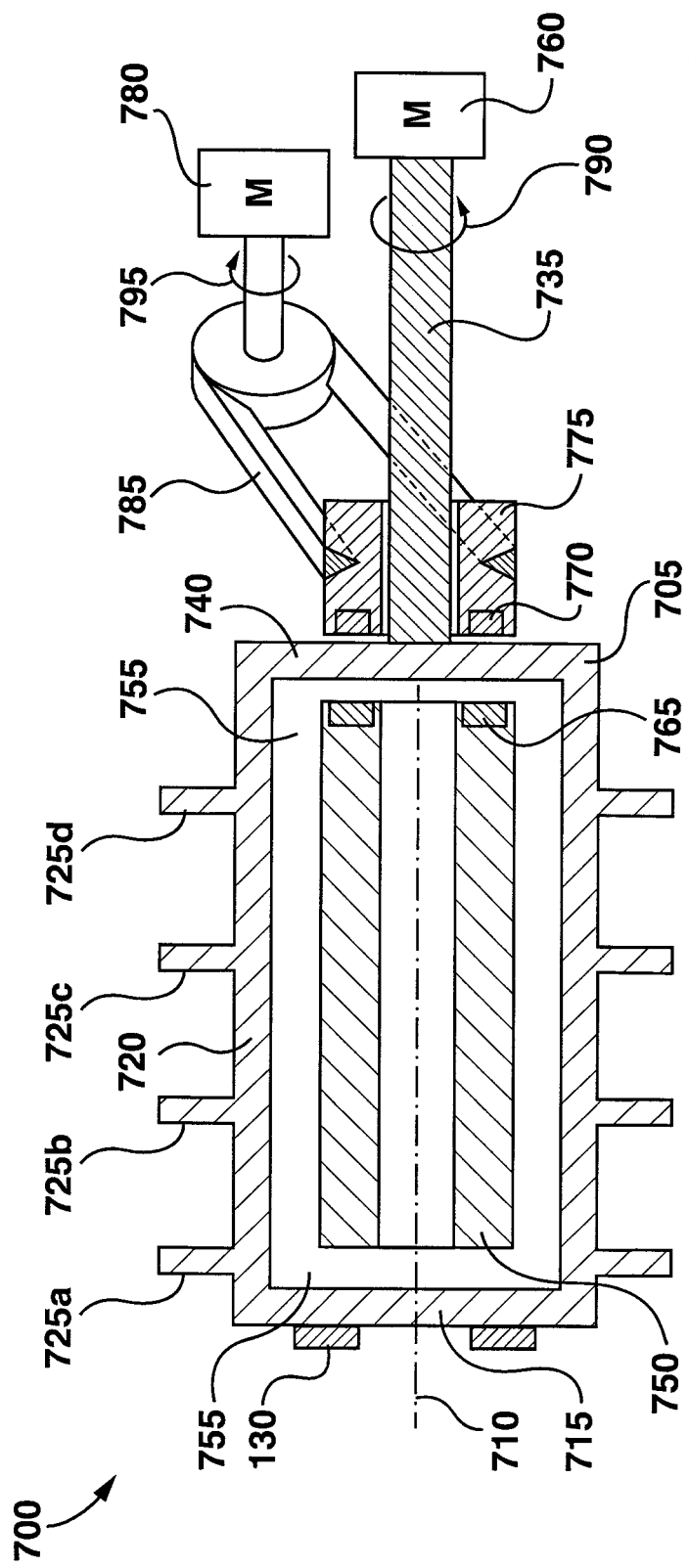
FIG. 7 shows a cross-sectional view of another implementation of the rotatable heat sink device, according to non-limiting implementations.

FIG. 7 shows a cross-sectional view of a rotatable heat sink device 700 comprising a heat sink 705 configured to enclose a cooling fluid and rotatable about a rotational axis 710. Heat sink 705 comprises a first end wall 715 and a second end wall 740, both extending radially from rotational axis 710, and both cooperating with a side wall 720 to define heat sink 705. Fins 725a, 725b, 725c, and 725d extend radially from the outer surface of side wall 720. A ring comprising an optical wavelength conversion material 130 is disposed on the outer surface of first end wall 715.

An agitator 750 is disposed inside heat sink 705 and is rotationally independent from heat sink 705. The space between agitator 750 and the walls of heat sink 705 defines flow channels 755 along which the cooling fluid flows and circulates between a first portion (e.g. first end wall 715) and a second portion (e.g. side wall 720 and second end wall 740) of heat sink 705. Agitator 750 comprises agitator magnets 765 which magnetically interact with driver magnets 770 of an agitator driver 775 disposed outside of heat sink 705. Device 700 absorbs and dissipates heat from conversion material 130 in a manner generally similar to the operation of device 100.

Heat sink 705 can be mechanically coupled to a heat sink motor 760 via a shaft 735. Heat sink motor 760 can rotate heat sink 705 along heat sink rotational direction 790. Agitator driver 775 can be mechanically coupled to an agitator motor 780 via a belt 785. Agitator motor 780 can rotate agitator driver 775, and thereby rotate agitator 750, along agitator rotational direction 795. Heat sink rotational direction 790 can be different than agitator rotational direction 795. The relative rotation of heat sink 705 and agitator 750 can promote the circulation of the cooling fluid between the first portion and the second portion of heat sink 705.

Heat sink motor 760 and agitator motor 780 can comprise, but are not limited to, DC brushless motors and stepper motors. Use of two separate motors to rotate heat sink 705 and agitator 750 can allow one to be rotated at a different speed and/or direction relative to the other. In addition, while FIG. 7 shows shaft 735 coupling heat sink 705 to heat sink motor 760 and belt 785 coupling agitator driver 775 to agitator motor 780, it is contemplated that any suitable mechanical couplings can be used to couple heat sink 705 and agitator driver 775 to their respective motors. Some examples of mechanical couplings include gears, a gear box, a clutch, a chain and sprocket, a shaft, a driving belt, a ring motor, and the like.

Figure 8:
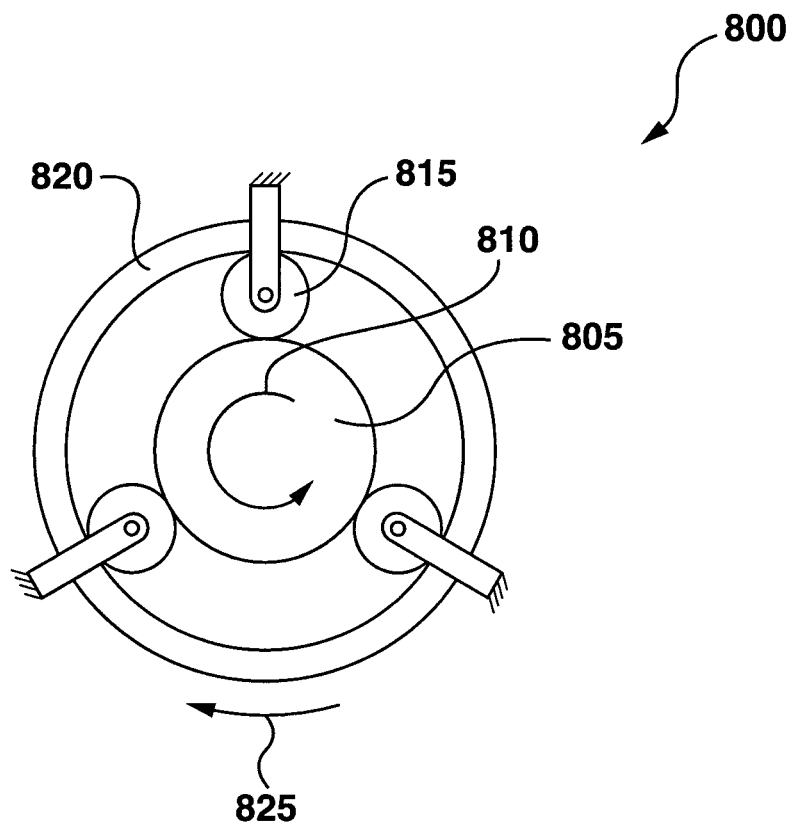
FIG. 8 shows a schematic view of a planetary gear system, according to non-limiting implementations.

While FIG. 7 shows heat sink 705 and agitator 750 driven by separate motors, it is also contemplated that the heat sink and the agitator can be driven by the same motor while remaining rotationally independent from one another. The heat sink and the agitator are rotationally independent if they are not restricted to rotating at the same speed and direction. For example, FIG. 8 shows an example planetary gear box 800 that can be used to rotate both the heat sink and the agitator powered by the same motor while keeping the agitator and the heat sink rotationally independent.

In gear box 800, a sun gear 805 can be secured around the circumference of shaft 735 which is powered by heat sink motor 760 and rotates heat sink 705. As sun gear 805 rotates along rotational direction 810, it engages and turns planet gears 815, which in turn engage with and turn ring gear 820 in a rotational direction 825 opposite the rotational direction 825 of sun gear 805 and shaft 735. If ring gear 820 is coupled to agitator driver 775, one motor 760 rotating shaft 735 can be used to rotate heat sink 705 and agitator 750 in opposite directions. In other implementations, different variations of planetary gear boxes can be used. For example, a different type of a planetary gear box with a stationary ring or sun gear (not shown) can be used where the planet gear carrier and the driven gear rotate in the same direction but at different speeds.

Figure 9:
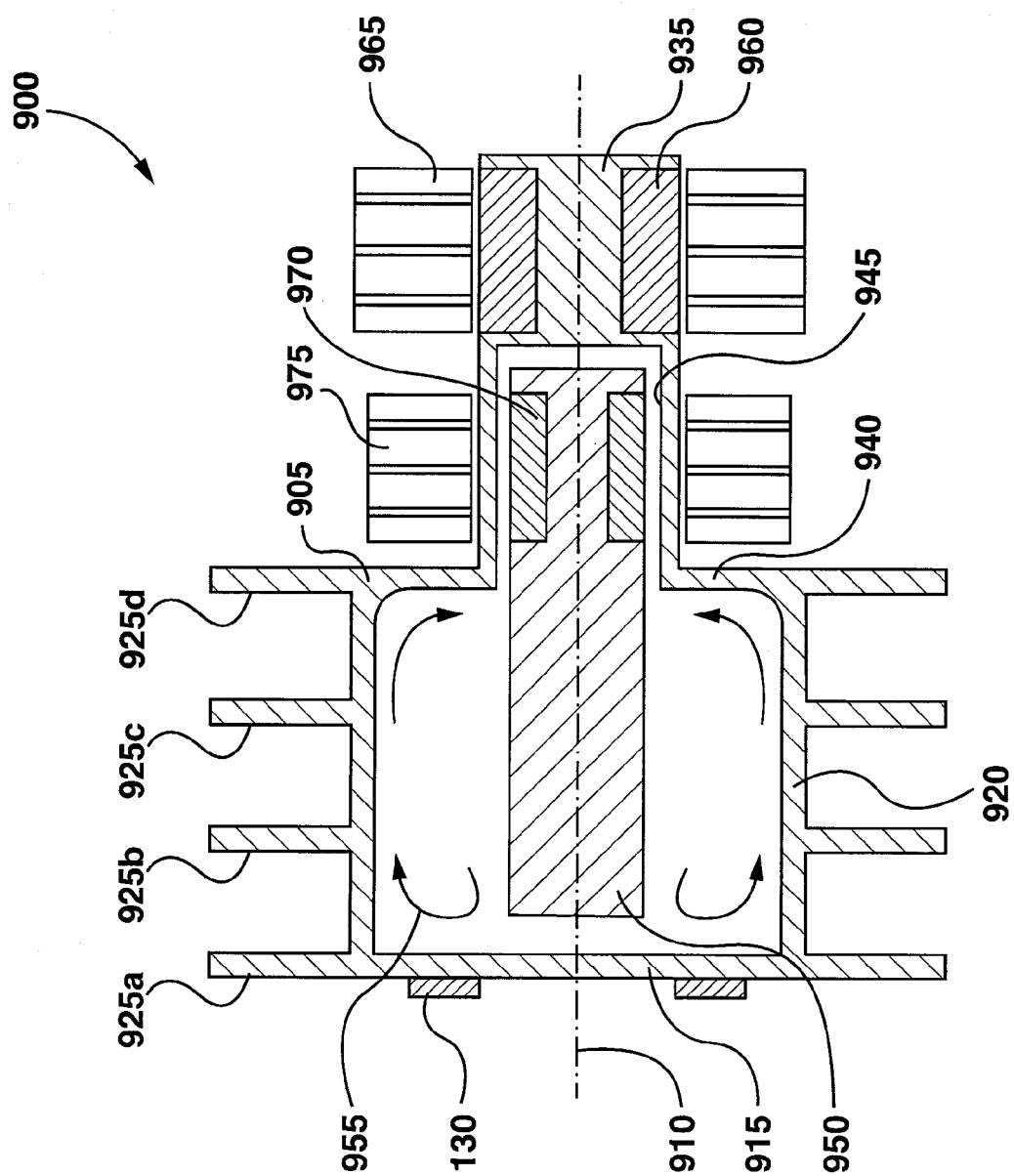
FIG. 9 shows a cross-sectional view of yet another implementation of the rotatable heat sink device, according to non-limiting implementations.

Now turning to FIG. 9, a cross-sectional view of rotatable heat sink device 900 is shown. Device 900 comprises a heat sink 905 configured to enclose a cooling fluid and to be rotatable about rotational axis 910. Heat sink 905 comprises a first end wall 915 and a second end wall 940, both extending radially from rotational axis 910. First end wall 915 and second end wall 940 cooperate with a side wall 920 to define heat sink 905. Fins 925a, 925b, 925c, and 925d extend radially from the outer surface of side wall 920. A ring comprising conversion material 130 is disposed on the outer surface of first end wall 915.

Second end wall 940 comprises a projection extending axially along rotational axis 910 and away from an inside of heat sink 905. This projection terminates in a shaft 935 extending axially along rotational axis 910. The projection also defines an agitator cavity 945 configured to receive at least a portion of an agitator 950 disposed inside heat sink 905. Agitator cavity 945 is shaped and sized so that agitator 950 remains rotatable about rotational axis 910 when the portion of agitator 950 is received inside agitator cavity 945. The portion of agitator 950 that is receivable into agitator cavity 945 comprises one or more agitator magnets 970 embedded into or formed as part of the portion of agitator 950.

Shaft 935 can also comprise one or more shaft magnets 960 embedded into or formed as part of shaft 935. Heat sink motor windings 965 can be disposed radially around the circumference of shaft 935 to be able to magnetically interact with shaft magnets 960. In addition, agitator motor windings 975 can be disposed radially around the outer circumference of the projection of second end wall 940 and outside heat sink 905. These agitator motor windings 975 are configured to magnetically interact with agitator magnets 970.

When heat sink motor windings 965 are powered, they can magnetically interact with shaft magnets 960 and exert a rotational force on shaft 935, which can in turn cause heat sink 905 to rotate about rotational axis 910. When agitator motor windings 975 are powered, they can magnetically interact with agitator magnets 970 and exert a rotational force on agitator 950 which can cause agitator 950 to rotate about rotational axis 910. By powering heat sink motor windings 965 independently from powering agitator motor windings 975, agitator 950 can be rotated independently of the rotation of heat sink 905. In addition, it is contemplated that agitator motor windings 975 can be powered in a manner that holds agitator 950 stationary even when heat sink 905 and the cooling fluid contained within it are rotating.

The relative motion of heat sink 905 and agitator 950 can cause the cooling fluid to circulate and flow along flow direction 955 between first portion (e.g. first end wall 915) and second portion (side wall 920 and second end wall 940) of heat sink 905. Flow direction 955 can be a function of the directions of rotation of heat sink 905 and agitator 950, the temperature gradient in the cooling fluid, and the orientation of device 900 relative to earth's gravitational field. Device 900 absorbs and dissipates heat from conversion material 130 in a manner generally similar to the operation of device 100.

Figure 10:
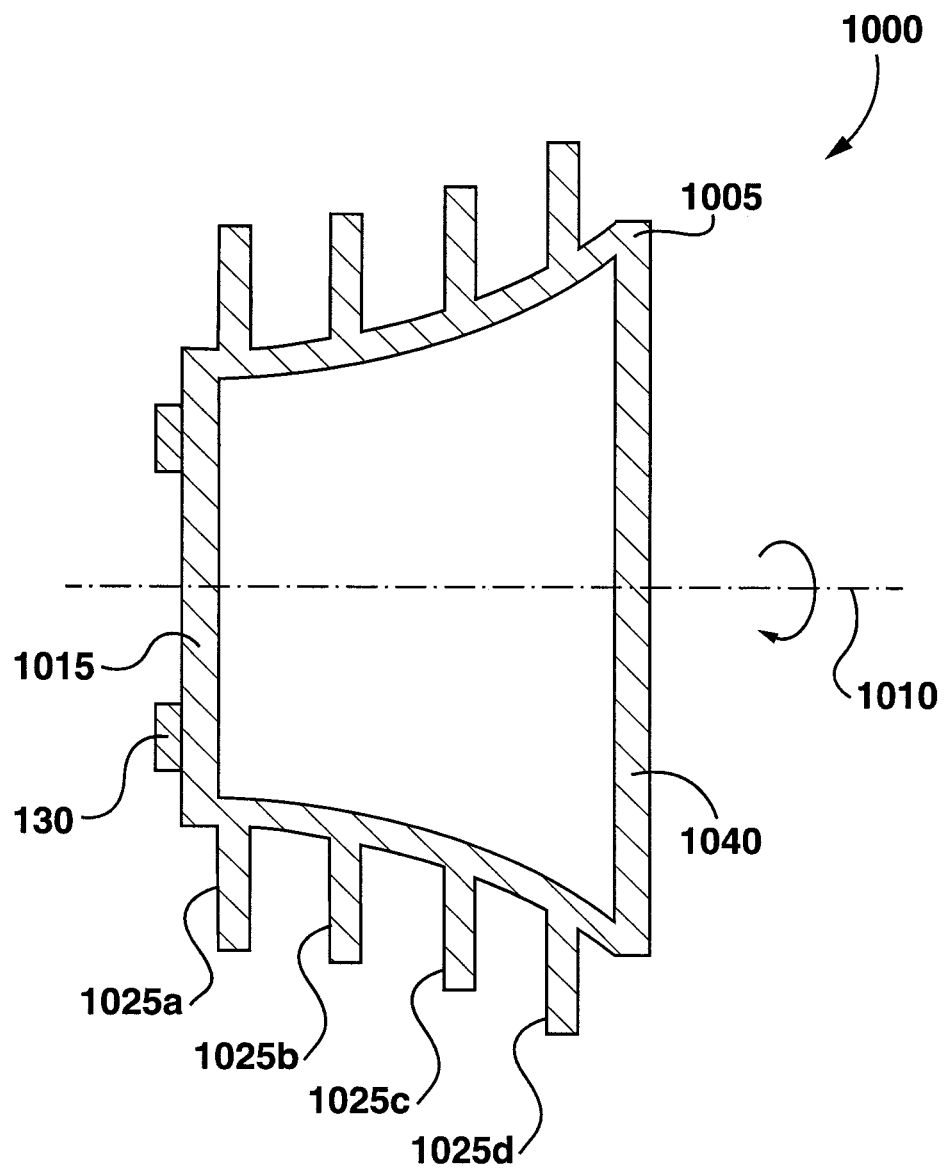
FIG. 10 shows a cross-sectional view of yet another implementation of the rotatable heat sink device, according to non-limiting implementations.

Now turning to FIG. 10, a cross-sectional view of rotatable heat sink device 1000 is shown. Device 1000 comprises a heat sink 1005 configured to enclose a cooling fluid and to be rotatable about rotational axis 1010. Heat sink 1005 comprises a first end wall 1015 and a second end wall 1040, both extending radially from rotational axis 1010. First end wall 1015 and second end wall 1040 cooperate with a side wall 1020 to define heat sink 1005. Fins 1025a, 1025b, 1025c, and 1025d extend radially from the outer surface of side wall 1020. A ring comprising conversion material 130 is disposed on the outer surface of first end wall 1015.

FIG. 10 shows side wall 1020 as being curved and having a concave curvature. It is also contemplated that in other implementations, the side wall can have a convex curvature, or any other suitable curved shape. The curvature and/or shape of the side wall can impact the flow and circulation of the cooling fluid inside the heat sink. Moreover, while FIG. 10 shows device 1000 without an agitator, it is contemplate that device 1000 can comprise an agitator disposed inside heat sink 1005. The agitator can be rotationally independent of heat sink 1005. It is also contemplated that inner surfaces of one or more of first end wall 1015, side wall 1020, and second end wall 1040 can comprise surface features configured to control and/or promote flow and circulation of the cooling fluid inside heat sink 1005.

Figure 11:
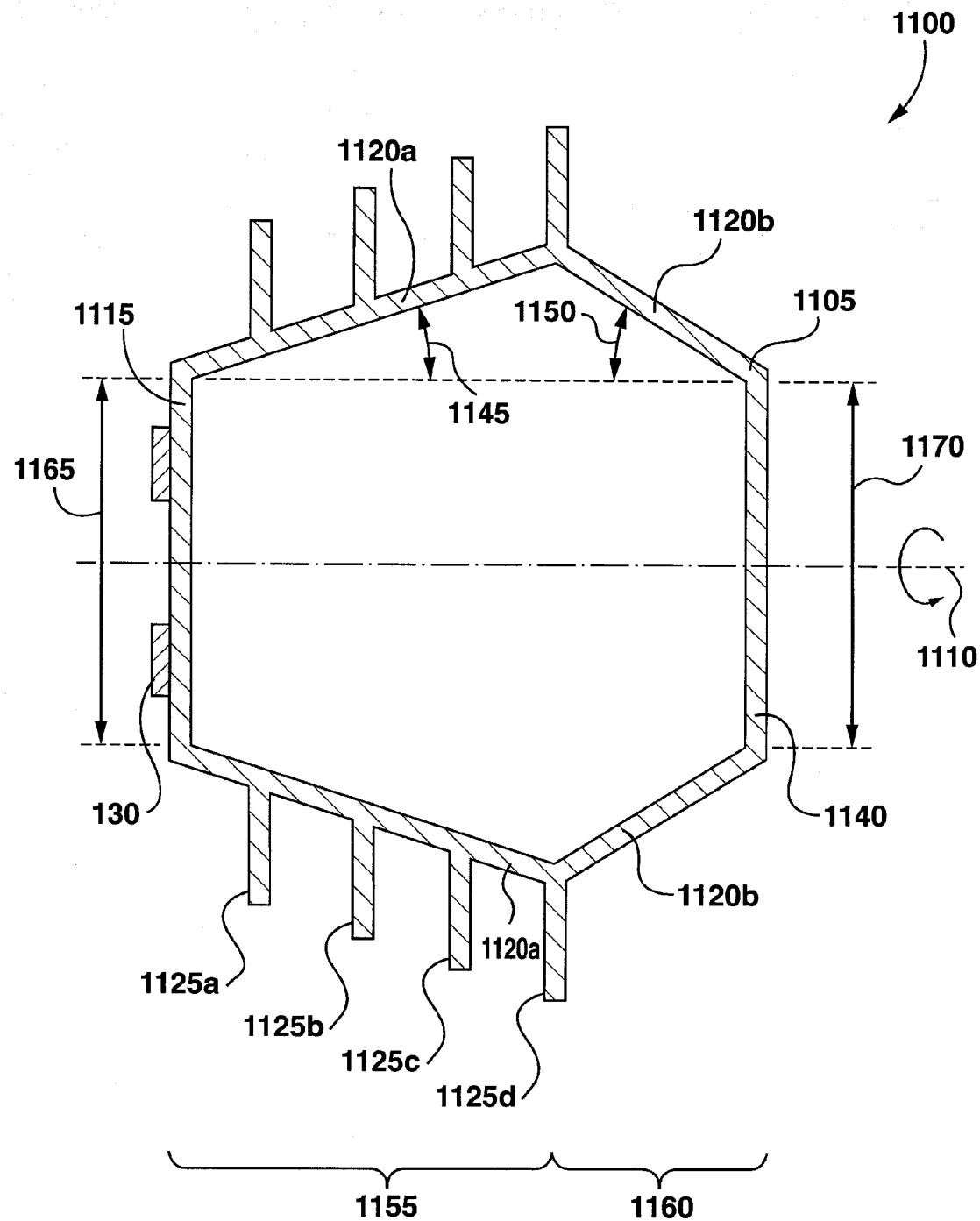
FIG. 11 shows a cross-sectional view of yet another implementation of the rotatable heat sink device, according to non-limiting implementations.

Now turning to FIG. 11, a cross-sectional view of rotatable heat sink device 1100 is shown. Device 1100 comprises a heat sink 1105 configured to enclose a cooling fluid and to be rotatable about rotational axis 1110. Heat sink 1105 comprises a first end wall 1115 and a second end wall 1140, both extending radially from rotational axis 1110. First end wall 1115 and second end wall 1140 cooperate with a side wall to define heat sink 1105. The side wall comprises two segments: a first segment 1120a and a second segment 1120b, disposed respectively at angles 1145 and 1150 to rotational axis 1110. Heat sink 1105 also comprises fins 1125a, 1125b, 1125c, and 1125d extending radially from the outer surface of segment 1020a of the side wall. A ring comprising conversion material 130 is disposed on the outer surface of first end wall 1015.

Since the side wall comprises two segments 1120a and 1120b, each at a corresponding angle to rotational axis 1110, the segments can define corresponding zones 1155 and 1160 inside heat sink 1105. Each of the zones 1155 and 1160 can affect and/or promote circulation of the cooling fluid differently. In some implementations, heat sink 1105 can comprise inner surface features corresponding to each zone 1155, 1160, to control and/or affect flow and circulation of the cooling fluid in that corresponding zone. In yet other implementations, device 1100 can comprise an agitator disposed inside heat sink 1105. The agitator can be rotationally independent of heat sink 1105. In some implementations, the agitator can have areas of different shapes and/or surface features, which areas can correspond to zones 1155 and 1160.

While FIG. 11 shows the side wall as having two segments 1120a and 1120b, it is contemplated that the heat sink can have any other suitable compound shape, comprising any number of side wall segments disposed at corresponding angles to rotational axis 1110. Moreover, while FIG. 11 shows first end wall 1115 having a diameter 1165 that is about equal to a diameter 1170 of second end wall 1140, it is contemplated that diameter 1165 can be larger or smaller than diameter 1170. It is also contemplated that one or more of first end wall 1115 and second end wall 1140 can also comprise multiple segments, each segment disposed at a corresponding angle to rotational axis 1110.

The implementations of the rotatable heat sink device described herein can provide heat sinks for rotating optical wavelength conversion materials, which heat sinks have enhanced rate of heat absorption and dissipation without the need for very large heat sink diameters or very high heat sink rotation rates. In addition, the devices of this specification can provide high heat flux liquid cooling in a rotating heat sink, without the need for rotating mechanical liquid seals. Moreover, the internal convection liquid cooling can more quickly and evenly distribute heat to all the fins, thereby allowing for larger inter-fin spacing and higher fin heat dissipation efficiency.

The above-described implementations are intended to be exemplary and alterations and modifications may be effected thereto, by those of skill in the art, without departing from the scope of the invention which is defined solely by the claims appended hereto.

We claim:

1. A device comprising:
   a heat sink configured to enclose a cooling fluid, the heat sink rotatable about a rotational axis, the heat sink comprising:
   a first portion configured to receive thermal energy from a source external to the heat sink; and
   a second portion configured to dissipate at least a portion of the thermal energy to surroundings external to the device;
   an optical wavelength conversion material disposed on an outside surface of the first portion; and
   an agitator disposed inside the heat sink, the agitator rotationally independent of the heat sink, the agitator configured to promote circulation of the cooling fluid between the first portion and the second portion.

2. The device of claim 1, wherein:
   the first portion comprises a first end wall disposed radially to the rotational axis; and
   the second portion comprises:
   a second end wall disposed radially to the rotational axis; and
   a side wall cooperating with the first end wall and the second end wall to define the heat sink.

3. The device of claim 2, wherein the side wall is disposed at an angle to the rotational axis, the angle greater than 0° and less than 90°.

4. The device of claim 2, wherein the second portion further comprises one or more fins extending from an outer surface of one or more of the side wall and the second end wall.

5. The device of claim 2, wherein an inner surface of one or more of the first portion and the second portion comprises one or more surface features configured to promote circulation of the cooling fluid between the first portion and the second portion.

6. The device of claim 5, wherein the one or more surface features comprise one or more of depressions and projections.

7. The device of claim 5, wherein the one or more surface features comprise one or more of grooves, baffles, fins, and blades.

8. The device of claim 2, wherein an inner surface of the side wall comprises a spiral screw surface profile configured to promote circulation of the cooling fluid between the first portion and the second portion.

9. The device of claim 1, further comprising the cooling fluid enclosed inside the heat sink.

10. The device of claim 9, wherein the cooling fluid comprises a liquid coolant.

11. The device of claim 9, wherein the cooling fluid comprises a liquid and gas mixture.

12. The device of claim 1, wherein the optical wavelength conversion material comprises one or more of a phosphor and quantum dots.

13. The device of claim 1, wherein the agitator comprises one or more surface features configured to promote circulation of the cooling fluid between the first portion and the second portion.

14. The device of claim 13, wherein the one or more surface features comprise one or more of depressions and projections.

15. The device of claim 1, wherein the agitator is configured to be magnetically coupled to an agitator driver disposable outside the heat sink.

16. The device of claim 1, wherein the agitator is configured to be rotated about the rotational axis at one or more of a speed and a direction different than a corresponding rotational speed and direction of the heat sink.

17. The device of claim 16, wherein the agitator is configured to be rotated intermittently about the rotational axis.

18. The device of claim 16, wherein the agitator is configured to be oscillated about the rotational axis.

19. The device of claim 1, wherein the agitator is configured to remain static when the heat sink is rotating about the rotational axis.

20. A device comprising:
a heat sink configured to enclose a cooling fluid, the heat sink rotatable about a rotational axis, the heat sink comprising:
  a first portion comprising a first end wall disposed radially to the rotational axis, the first portion configured to receive thermal energy from a source external to the heat sink; and
  a second portion configured to dissipate at least a portion of the thermal energy to surroundings external to the heat sink, the second portion comprising:
    a second end wall disposed radially to the rotational axis; and
    a side wall cooperating with the first end wall and the second end wall to define the heat sink; and
an agitator disposed inside the heat sink, the agitator rotationally independent of the heat sink, the agitator configured to promote circulation of the cooling fluid between the first portion and the second portion.

* * * * *